(No Model.) 2 Sheets—Sheet 1.
J. B. MAAS.
CAR COUPLING.
No. 396,943. Patented Jan. 29, 1889.
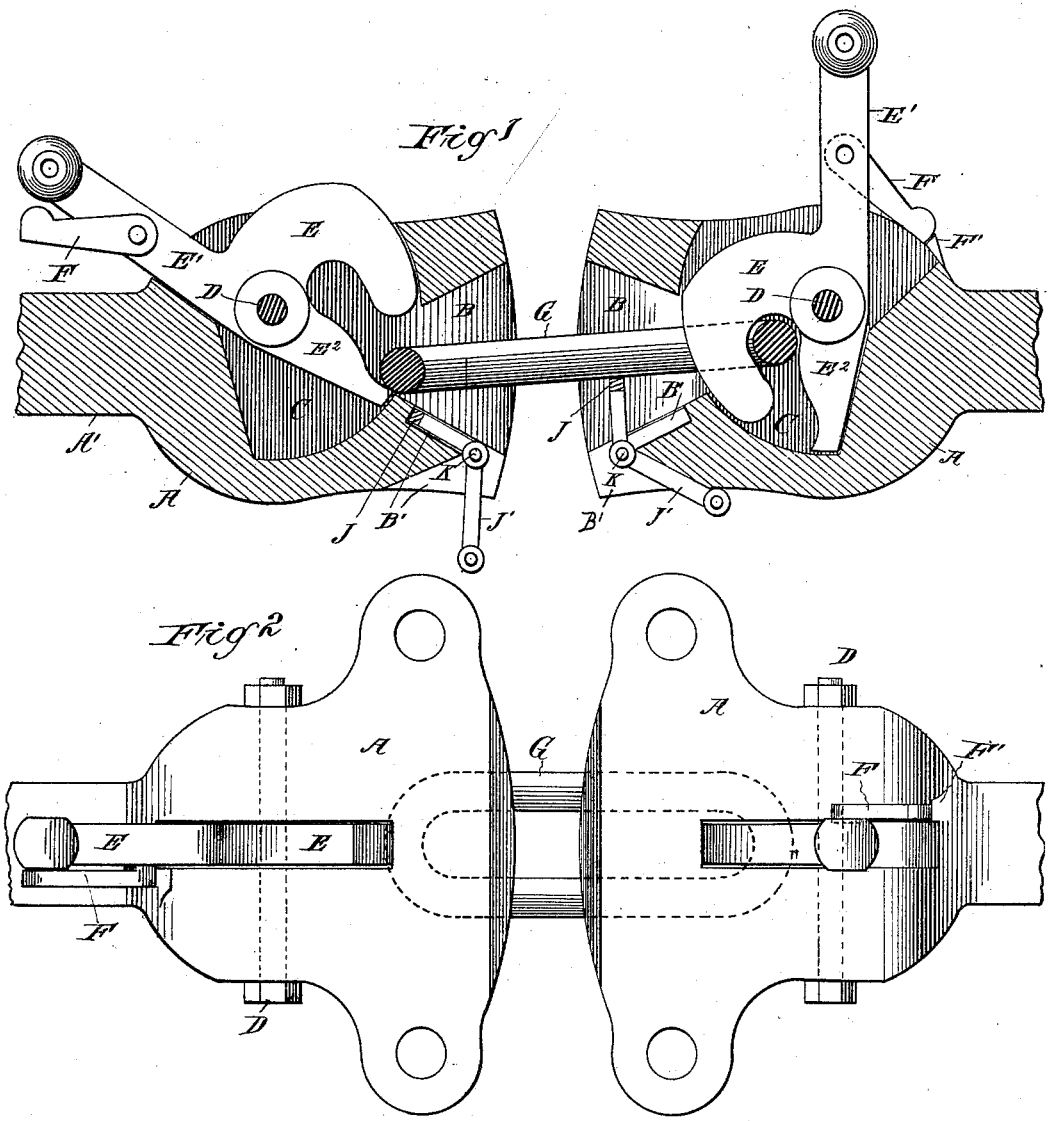
WITNESSES:
INVENTOR,
John B. Maas
BY
Frank A. Fouts
ATTORNEY.

(No Model.) 2 Sheets—Sheet 2.
J. B. MAAS.
CAR COUPLING.
No. 396,943. Patented Jan. 29, 1889.
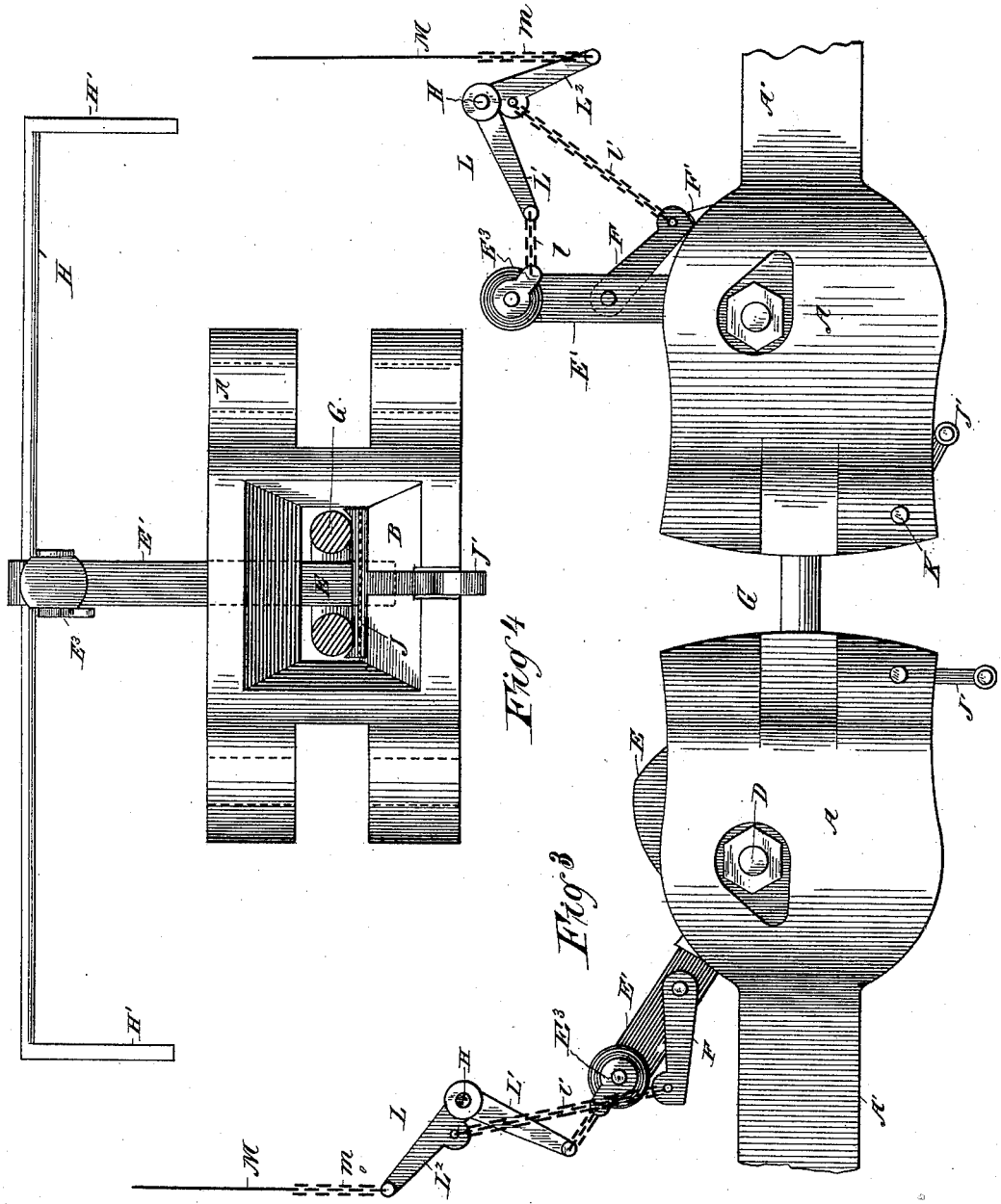
WITNESSES:
INVENTOR.
John B. Maas
BY
Frank A. Fouts
ATTORNEY.

UNITED STATES PATENT OFFICE.

JOHN B. MAAS, OF NEGAUNEE, MICHIGAN.

CAR-COUPLING.

SPECIFICATION forming part of Letters Patent No. 396,943, dated January 29, 1889.

Application filed May 28, 1888. Serial No. 275,295. (No model.)

*To all whom it may concern:*

Be it known that I, JOHN B. MAAS, a citizen of the United States, and a resident of Negaunee, in the county of Marquette and State of Michigan, have invented certain new and useful Improvements in Car-Couplings, of which the following is a specification.

My invention is an automatic car-coupler; and it consists in the parts which will be hereinafter described, and pointed out in the claims.

In the accompanying drawings, Figure 1 represents a vertical longitudinal view, partly in section, of two couplings embodying my improvement. Fig. 2 is a top plan view with the parts substantially in the positions as shown in Fig. 1. Fig. 3 is a side elevation of two draw-heads. This view shows a bell-crank lever and chains connected therewith for actuating the hook-arm and the dog connected to said arm, whereby the uncoupling may be effected from the top or side of a car. Fig. 4 shows a front view of a draw-head and link, the link being in section. In this view an upper horizontal rod with outer arms at right angles thereto is shown.

The letter A represents a draw-head, and A' the shank or stem thereof. The jaw of the draw-head on the inner side is beveled, being largest at the outer end. The opening B thus formed communicates with the main chamber C in said draw-head.

D is a transverse bolt passing through said chamber, through the walls thereof, and secured by nuts on the outer side thereof.

E is a hook, E' an upper arm, and $E^2$ a lower short arm. These parts E E' $E^2$ are formed integral. The bolt D passes through an opening in the body of the hook, so as to permit said hook to turn freely on the bolt. The forward wall and floor of the chamber aforesaid are curved in the arc of a circle, so as to conform to the arc described by the outer side of the hook and the lower end of the arm $E^2$ when said parts are turned. There is a large opening in the upper side of the draw-head, which communicates with the chamber aforesaid. This opening is sufficiently large to permit the arm E' to move forward and backward, and also permit the upper side of the hook to rise above the upper surface of the draw-head when said hook is raised, as shown in Figs. 1 and 3.

The lower lip of the draw-head is recessed at B' for the reception of a link-lifter, J. Said link-lifter consists of a horizontal cross-piece for engaging the link and a bell-crank body, J'. There is a transverse opening through the lower lip of the draw-head, in which is engaged a bolt, K. The bell-crank of the link-lifter at its elbow is pivotally engaged to the bolt K.

F is a dog pivotally connected to the arm E'. The upper rear side of the draw-head is provided with a notch, F', which forms a seat for the outer end of the dog F. This dog is to lock the arm E', so as to hold the hook in engagement with the link G—that is to say, to prevent the hook from becoming accidentally disengaged from the link.

H is a horizontal rod provided with outer arms, H' H'. These arms are at right angles to said rod. The rod is attached to the end of the car, so that it may be turned by its arms or by the inner bell-crank, L. This bell-crank is fixed to the rod H. The upper end of the arm E' is provided with a short arm, $E^3$, pivotally connected thereto. The outer arm, L', of the bell-crank is connected by a chain, $l$, with the arm $E^3$. The inner arm, $L^2$, of the bell-crank is connected by chain $l'$ to the outer end of the dog F.

M $m$ is a rod and chain connected. The lower end of the chain $m$ is connected to the outer end of the crank-arm $L^2$. The rod M extends upward to the top of a box-car, and may be secured by any suitable means.

The operation of the invention is as follows: When two cars are to be coupled, the link is placed in the still car, substantially as shown in the right-hand draw-head in Fig. 1. The approaching draw-head and its parts are in the position shown in the companion coupling. As the draw-heads come together, the link will enter the jaw of the approaching draw-head, striking the piece $E^2$ and forcing said piece backward. This action instantly forces down the hook E, so as to effect a coupling.

The link-lifter is only employed to elevate the link when a coupling is to be effected. The normal position of said lifter is shown in the left-hand draw-head, Fig. 1. The bell-crank to elevate the link is set by hand.

The uncoupling may be effected from the side of the car by turning one of the arms H'. This movement turns the rod H and the bell-crank L. The rotary movement of the crank-arms L' L² through the medium of the chains $l\ l'$ and short arm E³ disengages the dog F from its notch, forces back the arm E', and raises the hook E, thereby disengaging the hook from the link. A like result (uncoupling) may be effected by raising the rod M from the top of the car.

It will be observed that when the hook is under strain it rests against the outer wall of the draw-head chamber. By this arrangement the cross-bolt D is relieved from strain.

By the use of my coupling it is not necessary for an attendant to go between the cars either to couple or uncouple them.

Having thus described my invention, I claim as new and desire to secure by Letters Patent of the United States—

1. A car-coupler consisting of a draw-head provided with a jaw for the reception of a link and an inner chamber communicating therewith, and a hook and arm, E', pivotally mounted within said chamber, said arm being provided with the dog F, the draw-head being notched to receive said dog, substantially as described, and for the purposes set forth.

2. A car-coupler consisting of a draw-head provided with a jaw for the reception of a link and an inner chamber communicating therewith, a hook and arm, E', pivotally mounted within said chamber, and the dog F, pivotally attached to said arm, the draw-head being notched for said dog, in combination with the rod H, having arms H', bell-crank L, and the chains $l\ l'$, connected to the respective arms of said bell-crank, the outer ends of said chains being engaged, respectively, to the dog and arm E' aforesaid, substantially as set forth.

3. A car-coupler consisting of a draw-head provided with a jaw for the reception of a link and an inner chamber communicating therewith, a hook and arm, E', pivotally mounted within said chamber, and the dog F, pivotally attached to said arm, the draw-head being notched for said dog, in combination with the rod H, bell-crank L, and the chains $l\ l'$, connected to the respective arms of said bell-crank, the outer ends of said chains being engaged, respectively, to the dog and arm E' aforesaid, and the rod M, connected to an arm of the bell-crank, as specified, substantially as described.

Signed at Negaunee, in the county of Marquette and State of Michigan, this 16th day of April, A. D. 1888.

JOHN B. MAAS.

Witnesses:
 T. C. YATES,
 F. M. BENEY.